United States Patent
Winter et al.

(10) Patent No.: US 7,904,413 B2
(45) Date of Patent: Mar. 8, 2011

(54) METHOD AND SYSTEM TO SEGMENT AN OLAP SET

(75) Inventors: Stewart James Winter, Metcalfe (CA); Andrew Alexander Leikucs, Ottawa (CA); Mark Randy Westman, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/864,111

(22) Filed: Sep. 28, 2007

(65) Prior Publication Data

US 2009/0089240 A1  Apr. 2, 2009

(51) Int. Cl.
*G06F 17/10* (2006.01)
*G06F 7/06* (2006.01)

(52) U.S. Cl. .................. 706/60; 707/602; 707/603

(58) Field of Classification Search .............. 706/60
See application file for complete search history.

(56) References Cited

OTHER PUBLICATIONS

Radi, Adding Smartness to Mobile Devices—Recognizing Context by Learning from User Habits, Johannes Kepler Universitat, Linz, pp. 1-143, Jan. 2006.*

* cited by examiner

*Primary Examiner* — Michael B. Holmes
*Assistant Examiner* — Nathan H Brown, Jr.
(74) *Attorney, Agent, or Firm* — Shumaker & Sieffert, P.A.

(57) ABSTRACT

A segmentation management system manages segmentation of a set of members in a multi-dimensionally modeled data source. The segmentation management system comprises a segment definition manager, a segmentation engine and a segment application manager. The segment definition manager manages definitions of identifiable non-overlapping segments for a given base set of members in a multi-dimensionally modeled data source. The segmentation engine divides the base set of members into the segments based on the definitions of the segments. The segment application manager allows the segments to be used as objects.

25 Claims, 6 Drawing Sheets

METHOD AND SYSTEM TO SEGMENT AN OLAP SET

FIELD OF THE INVENTION

The present invention relates to a method of and system to segment an Online Analytic Processing (OLAP) set.

BACKGROUND OF THE INVENTION

In the Business Intelligence (BI) computer applications domain, business decision makers use analytical software to pose operational performance questions as queries against multi-dimensionally modeled business databases and data warehouses. These multi-dimensional models and analysis software tools are based on Online Analytic Processing (OLAP) concepts and technology. The analysis activity typically involves the creation and manipulation of reports.

Large OLAP databases and multi-dimensionally modeled data warehouses typically contain large numbers of dimensional members or flat/non-existent dimensional hierarchies, or both. This is due to a variety of factors, including the volume of available and important data as a business operates and grows, the time constraints and computing resources required to stage and model the data warehouse and make it available for business decision-making processes, the need for flexible, unconstrained models for key business dimensions such as Customers and Time, or non-hierarchical models for inherently parent-child-relationship dimensions such as Invoices and Orders.

When a user is working with a large set of members from an OLAP database, the user can be overwhelmed by the details stored within the database. Thus, it is desirable for the user to be able to break the set up into discrete pieces and then to work with those pieces as conceptual objects.

There exists a technique that provides a simplistic split of a set of members into a subset of members about which the user cares (included) and a subset of members about which the user does not care (excluded).

Also, some data sources include corporate standard segmentations. Corporate standard segmentations are segmentation concepts that are defined by the business model of a company or subset of the company. These segments are typically well-understood by all users. An example of corporate standard segmentations is between legacy products and current products.

However, these existing segmentation mechanisms do not provide sufficient flexibilities in some situations.

It is therefore desirable to provide a mechanism for improved segmentation management.

SUMMARY OF THE INVENTION

It is an object of the invention to provide an improved method and system to segment an OLAP set.

The invention uses a mechanism to divide a base set of members into separate identifiable non-overlapping segments.

In accordance with an aspect of the present invention, there is provided a segmentation management system for managing segmentation of a set of members in a multi-dimensionally modeled data source. The segmentation management system comprises a segment definition manager, a segmentation engine and a segment application manager. The segment definition manager is provided for managing definitions of identifiable non-overlapping segments for a given base set of members in a multi-dimensionally modeled data source. The segmentation engine is provided for dividing the base set of members into the segments based on the definitions of the segments. The segment application manager is provided for allowing the segments to be used as objects.

In accordance with another aspect of the present invention, there is provided a method of managing segmentation of a set of members in a multi-dimensionally modeled data source. The method comprises the steps of creating definitions of identifiable non-overlapping segments for a given base set of members in a multi-dimensionally modeled data source, dividing the base set of members into the segments based on the definitions of the segments; and using the segments as objects.

In accordance with another aspect of the present invention, there is provided a computer readable medium storing instructions or statements for use in the execution in a computer of a method of managing segmentation of a set of members in a multi-dimensionally modeled data source. The method comprises the steps of creating definitions of identifiable non-overlapping segments for a given base set of members in a multi-dimensionally modeled data source, dividing the base set of members into the segments based on the definitions of the segments; and using the segments as objects.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
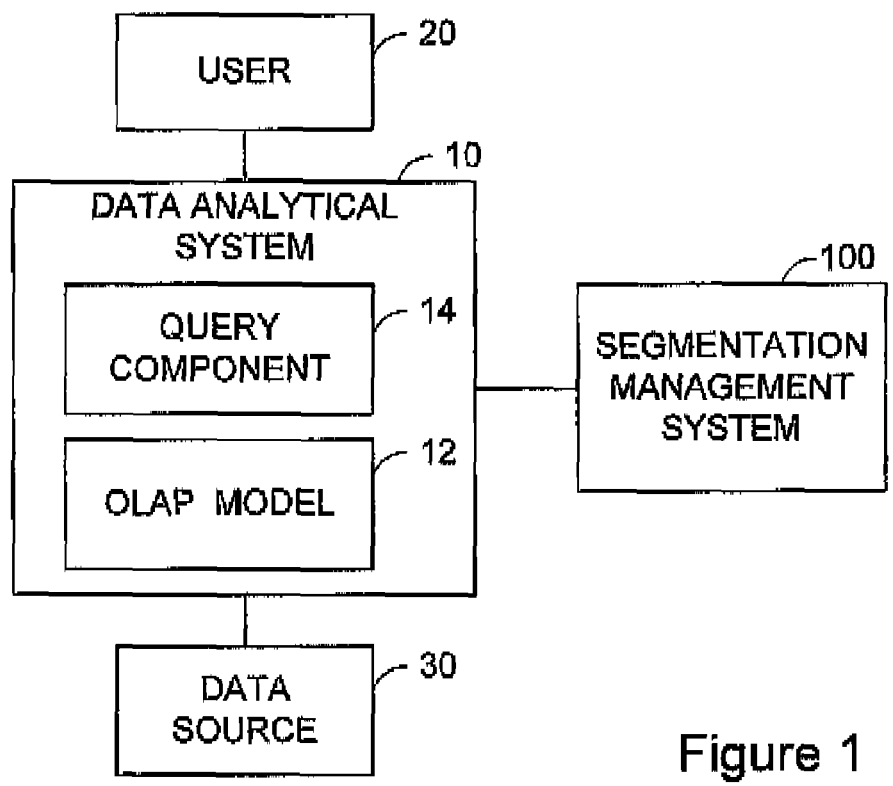
FIG. 1 is a block diagram showing a segmentation management system in accordance with an embodiment of the present invention.
Figure 2:
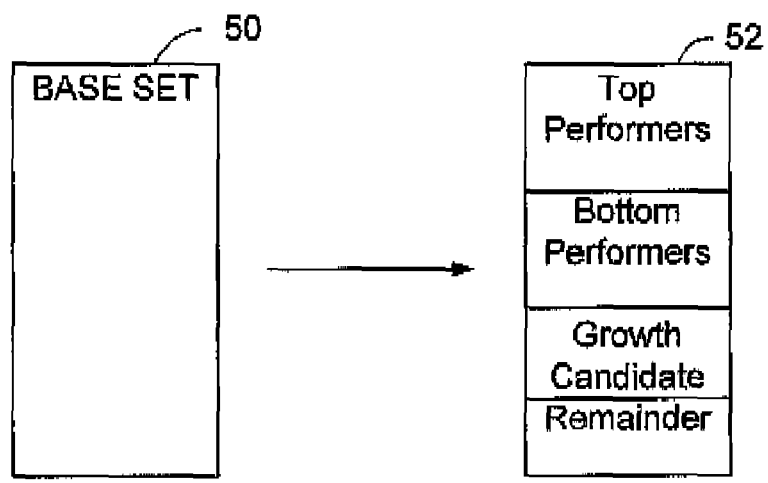
FIG. 2 is a diagram showing an example of segmentation of a base set of members of an OLAP model.

Referring to FIGS. 1 and 2, a segmentation management system 100 in accordance with an embodiment of the invention is described.

The segmentation management system 100 manages segmentation of a set of members of a multi-dimensionally modeled data source, e.g., an Online Analytical Processing (OLAP) model. A data analytical system 10 has an OLAP model 12 that represents one or more data sources 30 storing data, e.g., for an organization. Data sources 30 may be one or more multi-dimensionally modeled databases and/or data warehouses. Users 20 query the data analytical system 10 for analysing data in the data sources 30. In response to the queries, a query component 14 of the data analytical system 10 retrieves relevant data from the data sources 30 using the OLAP model 12, and generates views or reports to present the relevant data to the users 20. The reports are often presented in the form of trees, crosstabs or graphical representations of relevant data.

The data analytical system 10 may be suitably implemented in various types of computer systems, including those in server-client environments. While FIG. 1 shows the segmentation management system 100 as an independent element from the data analytical system 10, in a different embodiment, the segmentation management system 100 may be provided as part of a data analytical system 10.

The segmentation management system 100 manages segmentation and analysis of a set of members in the OLAP model 12. The segmentation management system 100 allows the user to split a set of members up into multiple identifiable segments, each with a meaningful label.

FIG. 2 represents a pictorial representation of converting a set of members through the use of segmentation from a complete set of members of an arbitrary base set 50 to a set 52 of members grouped by their function as determined by the user. In this example, the base set 50 of sales represents are separated into a set 52 of grouped members "top performers", "bottom performers", "growth candidates" and "remainder".

Such segmentation is not available within the data source 30. By using such segmentation, the segmentation management system 100 allows the user to designate areas of interest, i.e., members to be included or excluded in data analysis, based on segment selection, rather than expression definition of each member. Also, the segmentation management system 100 allows the user to use segments as an object for further analysis, such as looking at how an individual member has moved across segments over time.

Figure 3:
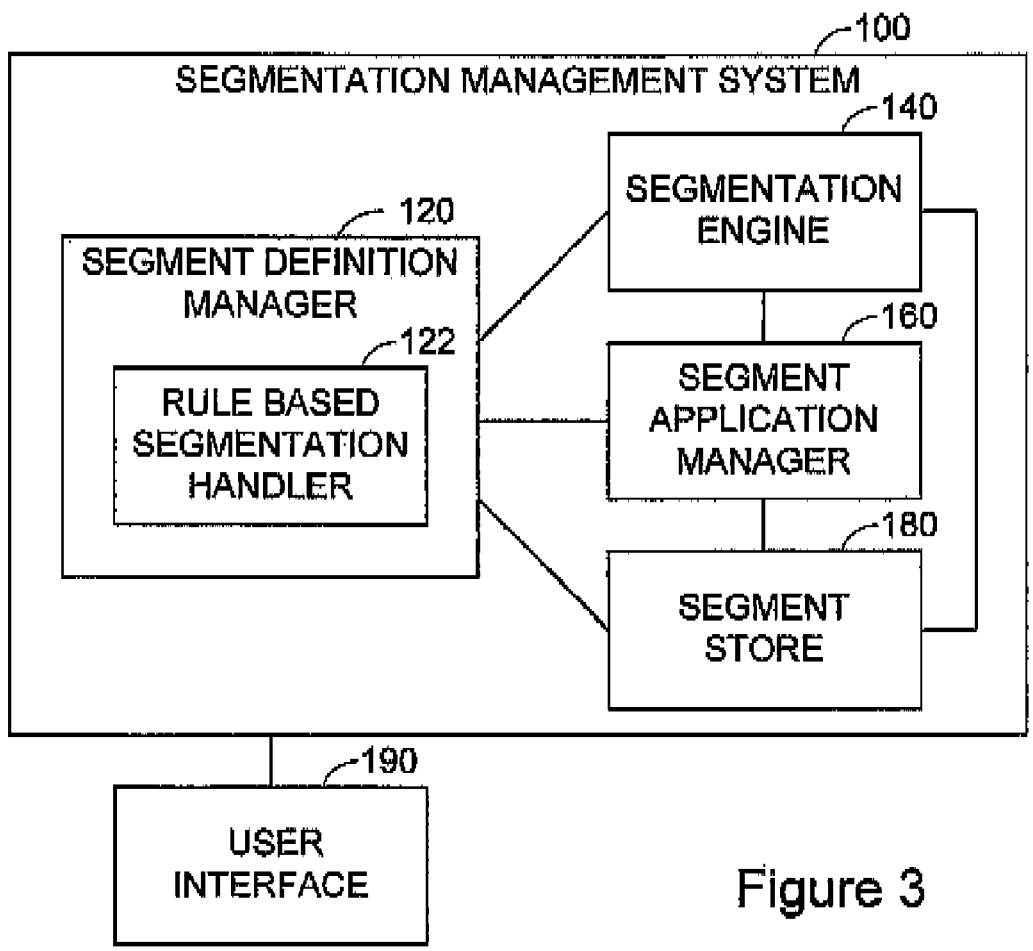
FIG. 3 is a block diagram showing an embodiment of the segmentation management system.

FIG. 3 shows an embodiment of the segmentation management system 100, which comprises a segment definition manager 120, a segmentation engine 140, a segment application manager 160 and a segment store 180.

The segment definition manager 120 manages definition of segments. For a given base set of members, the segment definition manager 120 defines separate non-overlapping segments, each having an identification or label. The segments are defined using several techniques including:

Sets split into segments by computational calculations, such as percent, rank, or standard deviation Sets split into segments by filters Members assigned to segments by explicit member reference The segment definition manger 120 has a rule based segmentation handler 122. The segment definition manager 120 interacts with a user interface 190. In this embodiment, the segmentation management system 100 uses the user interface 190 which is provided outside the segmentation management system 100. The user interface 190 may be provided within the data analytical system 10. In a different embodiment, the segmentation management system 100 may have a user interface therein.

Figure 5:
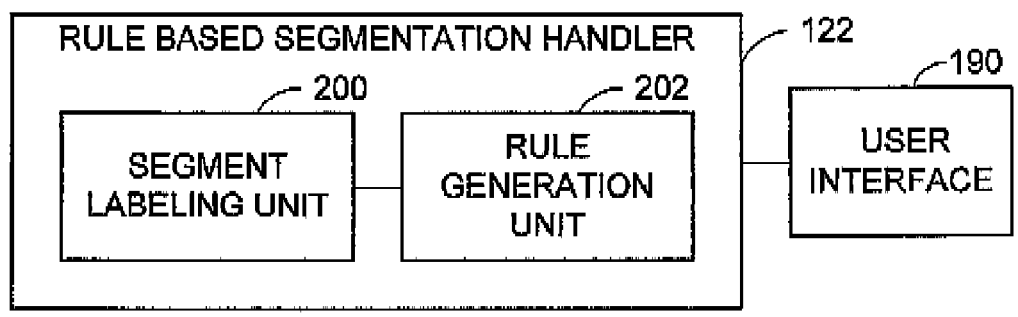
FIG. 5 is a block diagram showing an embodiment of a rule based segmentation handler of the segmentation management system.

The rule based segmentation 122 handles rule based segmentation. FIG. 5 shows an embodiment of the rule based segmentation handler 122. The rule based segmentation handler 122 has a segment labelling unit 200 and a rule generation unit 202.

Rule based segmentation occurs in two forms. The first form is a style where the conceptual segmentation occurs ahead of the rule construction. The second form is a style where the rule is constructed in parallel or ahead of the conceptual segmentation.

The segment labelling unit 200 assists the user to handle labelling of segments through the segmentation user interface 190. If the user first determines the conceptual segmentation and segment labels, then the user provides a name for a segment that matches the conceptual model that the user is trying to create. For example, in the example shown in FIG. 2, the user decides ahead of time that she wants to have a "top performers" segment, but she does not know how to define it nor what it contains. In this example, the user simply needs to enter the label of the segment. If the user determines the rule first, the segment definition manager 120 generates a name based on the modeling behaviour algorithms or rules that are embedded in the system 100. The name reflects that model and the parameters it is applying.

The rule generation unit 202 assists the user to handle segmentation rule generation through the segmentation user interface 190. For segmentation by computational calculations, the rule generation unit 202 generates rules for calculating each segment based on the segment criteria, e.g., percent, rank, and standard deviation. For segmentation by filters, the rule generation unit 202 generates rules that define the filters. For segmentation by assigning members to segments using explicit member reference, the rule generation unit 202 generates rules of member assignment. The generated rules are a series of ordered filters, each filter defining a subset of members, i.e., a segment, and then allowing the remainder of members to flow through to the next filter defining the next segment.

Figure 6A:
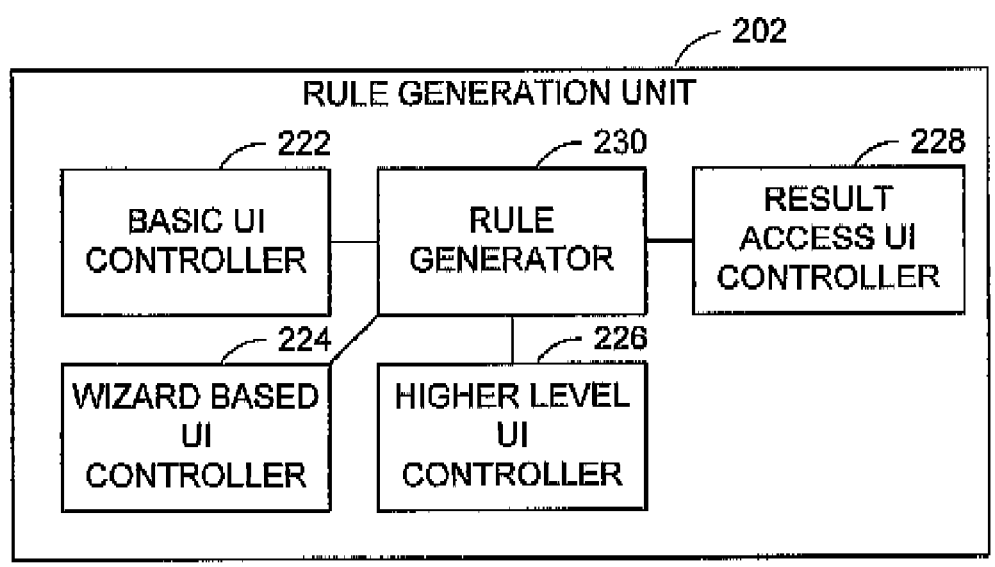
FIG. 6A is a block diagram showing an embodiment of a rule generation unit.

As shown in FIG. 6A, the rule generation unit 202 may have a basic user interface controller 222, a wizard based user interface controller 224, a higher level user interface controller 226, a result access user interface controller 228 and a rule generator 230. These controllers provide users information and allow the users to interact with the given information through the user interface 190 or other appropriate user interface.

The basic user interface controller 222 provides a basic user interface to permit entering any of the types of rules. The basic user interface controller 222 expresses segments in terms of filters. Using a basic user interface, the basic user interface controller 222 allows the user to define a filter expression to define each segment. The basic user interface also allows the user to define the order of the processing of the filters to define the segments.

The wizard based user interface controller 224 provides a wizard based user interface that assists the user in construction of the rules by posing a series of predefined questions. A wizard in this case may simply guide the user through the construction of the filters described for the basic user interface controller 222. In a different embodiment, a wizard may be intended to segment the data based on ranges. An example of this may be segmentation based on standard deviation. For example, the user inputs the range, e.g., (0 to 2), (2 to 3) and (3 or more), as the segments. In addition, the user may input the measure for the basis of the standard deviation. The wizard based user interface controller 224 may provide a number of wizards.

The higher level user interface controller 226 provides a higher level user interface that provides higher level conceptual metaphors that allow the user to generate rules without the level of detailed knowledge required in using the basic user interface. The higher level user interface controller 226 may provide a domain specific higher level user interface. For example, the higher level user interface controller 226 may provide a higher level user interface that utilizes an interactive graphical representation of the data, such as a graphical representation of the data shown in FIG. 4. Using the interactive representation of the data, the user may slide the horizontal and vertical split bars left/right/up/down, until the segments are visually correct. The higher level user interface controller 226 may provide a number of user interfaces.

Figure 4:
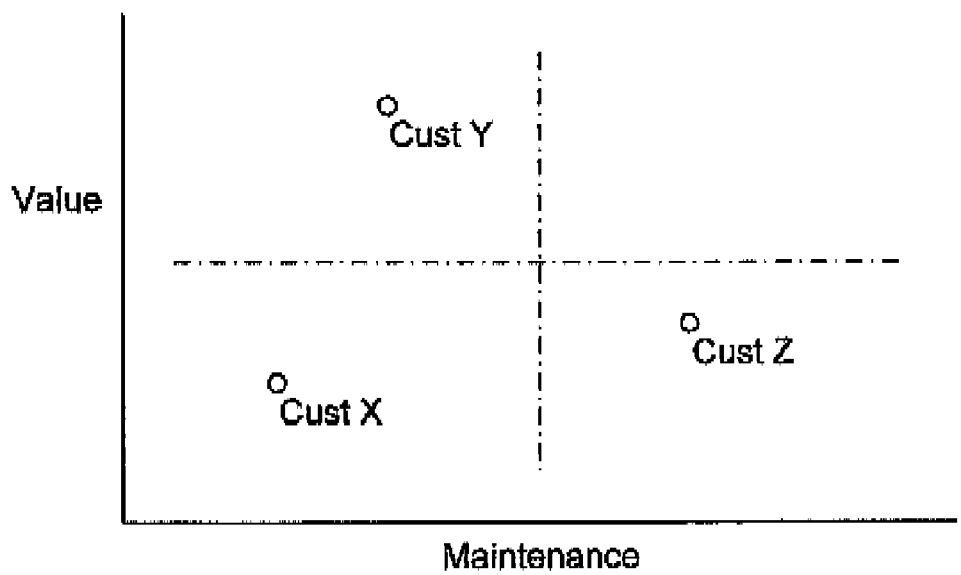
FIG. 4 is a diagram showing a example of a graphical representation of segmentation.

The higher level user interface controller 226 may provide embedded high level user interface based wizard for common user segmentations. An example of such a wizard may (a) allow the user to select a set and invoke the wizard, (b) provide the wizard prompts for additional context, (c) provide a graphical representation of a set, (d) provide visual tools to segment the set, and (e) allow the user to indicate completion so that the set is broken in the segments defined in the previous step (d). In the example used in FIG. 4, in step (b), the high level user interface prompts for two measures and the user may supply "value" and "maintenance". In step (c), the high level user interface provides a two-measure scatter chart as shown in FIG. 4. In step (d), the high level user interface provides two sliders which divide the chart into four areas as visual tools to segment the set.

The rule generator 228 generates rules based on the user's inputs and selections through these user interfaces. For example, the rule generator 228 may determine criteria based on the locations of the horizontal and vertical split bars in a graph representing the data segmentations, and generate rules using the criteria.

The result access user interface controller 228 provides users with access to the result that the rule generator 230 produces. Users can view and manipulate the resultant set of rules.

Figure 6B:
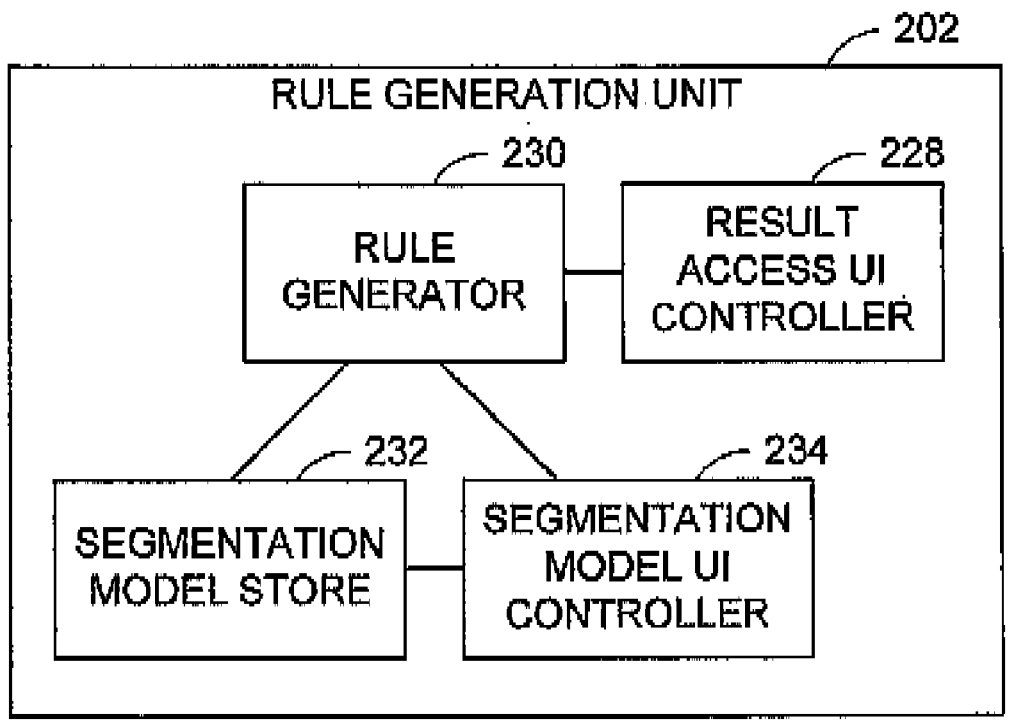
FIG. 6B is a block diagram showing another embodiment of the rule generation unit.

For the second form of rule based segmentation, as shown in FIG. 6B, the rule generation unit 202 may have a segmentation model store 232, a segmentation model user interface controller 234, the rule generator 230 and the rule access user interface control 228.

The segmentation model store 232 stores available segmentation models. Each model has parameters to define segmentations. The segmentation model user interface controller 234 provides through the user interface 190 a list of available segmentation models, and receives user's selection of a model and values of parameters for the model. The segmentation model user interface controller 234 provides an intuitive way of supplying parameters to the model. For example, consider a simple model called "top and bottom %". Such a model needs only one parameter (the percentage) with a valid range from 0 to 50 and the segmentation splits as top n %, bottom n % and remainder. In such a case, the segmentation model user interface controller 234 may provide a simple UI to allow the user to enter a value. In a different embodiment, alternative user interfaces, such as a slider control, may be used. Such a model in the model store 232 may define not only the rule construction, but also the default label construction.

The rule generator 230 generates rules based on the selected model and given parameter values. The rule access user interface control 228 makes the generated rules available to the user for manipulation.

The rule generation unit 202 may have the components shown in both FIGS. 6A and 6B.

The two forms of rule based segmentation are now described further using examples.

The first form of rule based segmentation occurs when the user determines first what the labels are for desired segments and then creates rules that break the base set up into the correct conceptual segments as labelled. For example, the user may define the resulting segmentation to group a set of customers into four segments "high value, high maintenance (HV, HM)", "low value, high maintenance (LV, HM)", "low value, low maintenance (LV, LM)", and "high value, low maintenance (HV, LM)". The user may think of these customers visually as belonging to a quadrant shown in FIG. 4. For the user, the most valuable customers are the high value, low maintenance customer, such as Cust Y in FIG. 4. The least valuable customers are those of low value and high maintenance, such as Cust Z in FIG. 4. The segment labelling unit 200 allows the user to define these segment labels.

In this form of segmentation, the user has predetermined the segmentation before looking at the data. This segmentation can be considered as a form of modeling of the data. The user may further extend the definition of the segments to give them specific labels, such as "best customers".

Having defined the desired results of segmentation, the user then creates rules that match the defined results using the rule generation unit 202. In the above example, the user may create filters to allocate customers to segments. For example, the user may create the following filters (1):

HV,HM=>topPercent(topPercent([customers],50,tuple (maintenance)),50,tuple(revenue))

LV,HM=>topPercent([remainder of HVHM],50,tuple (maintenance))

HV,LM=>topPercent([remainder of LVHM],50,tuple (revenue))

LV,LM=>[remainder of HVLM]  (1)

The rule generation unit 202 may allow the user to slide the horizontal and vertical split bars of the graph shown in FIG. 4 left/right/up/down to determine the segments. Based on the location of the horizontal and vertical split bars on the graph, the rule generation unit 202 determines criteria of the segmentation split, and creates or modifies filters using the criteria.

The second form of rule based segmentation occurs when the user determines first what rule is to be applied to segment a base set. The rule generation unit 202 assists the user to define the segmentation rules. For example, the user segments customers as follows:

(a) top 10% of customers by revenue
(b) bottom 10% of customers by revenue
(c) remaining customers At the same time or later, the user defines the labels of the segments using the segment labelling unit 200. The rules in this form of segmentation tend to be mathematical and the conceptual identification of the segments is similarly mathematical.

Figure 7:
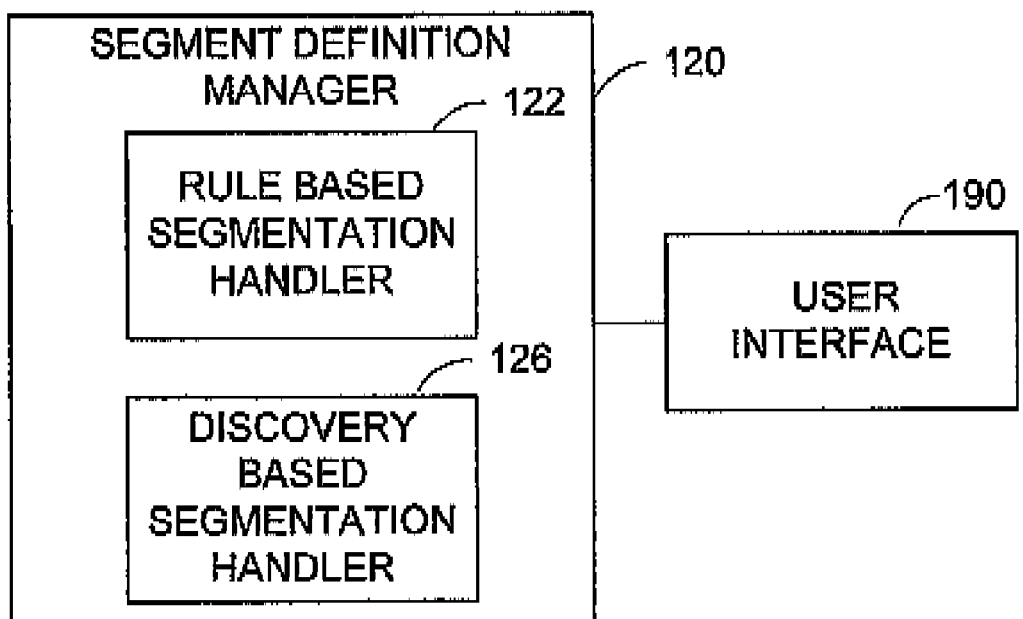
FIG. 7 is a block diagram showing an embodiment of a segment definition manager of the segmentation management system.

As shown in FIG. 7, the segment definition manger 120 may also have a discover based segmentation handler 126.

The discovery based segmentation 126 handles discovery based segmentation. In discovery based segmentation, the user has no preconceived segmentation of the data when initiating the segmentation process. The discovery based segmentation 126 includes the ability to link to or integrate with a discovery based engine, such as a data mining engine, to allow the segmentation management system 100 to be augmented with externally created parameterizable models. By using such a discovery based engine, the discovery based segmentation 126 can assist the user to find meaningful correlations in the data and offer suggestions of possible segmentation rules.

The segmentation engine 140 divides a base set of members of the OLAP model 12 into separate non-overlapping segments based on the segment definitions defined by the segment definition manager 120. Each segment has a label or name and can be used as a consumable piece for query use.

The segmentation engine 140 executes the series of ordered filters as defined for a given base set. The segmentation engine 140 executes each filter in the order to obtain a subset of members forming each segment, while allowing the remainder of members to flow through to the subsequent filters.

Figure 8:
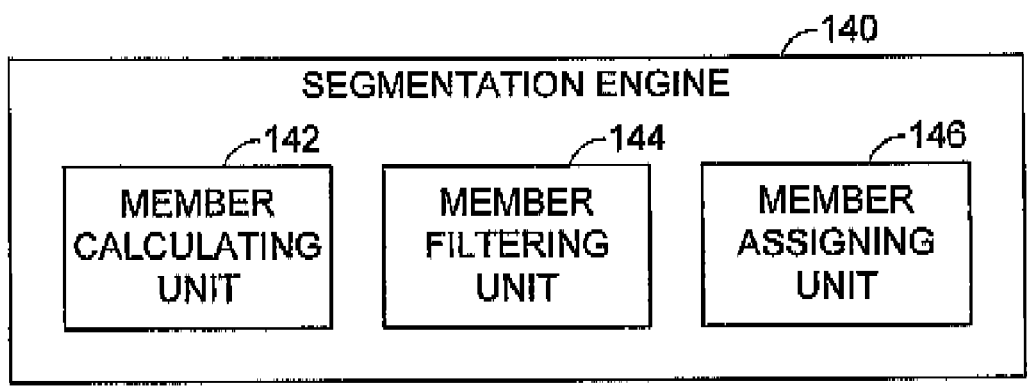
FIG. 8 is a block diagram showing an embodiment of a segmentation engine of the segmentation management system.

As shown in FIG. 8, the segmentation engine 140 may have a member calculating unit 142, a member filtering unit 144 and a member assigning unit 146.

The member calculating unit 142 handles segmentation by computational calculations. The member calculating unit 142 calculates for each member of a given set a value relating to the defined criteria, e.g., percent, rank, or standard deviation.

The member filtering unit 144 handles segmentation by filters. The member filtering unit 144 executes a filter defined for a segment to obtain members in a given set that passes the filter.

The member assigning unit 146 handles segmentation by assigning members to segments. The member assigning unit 146 determines a member in a given set that is explicitly referenced to be assigned for a given segment.

The segment store 180 stores segment definitions defined by the segment definition manager 120, including the rules and the labels. The segment store 180 may also store the base sets of members. In FIG. 3, the segment store 180 is illustrated as part of the segmentation management system 100. In different embodiments, the segment store 180 may be provided as a separate component from the segmentation management system 100. It may be part of the OLAP model 12.

The segment application manager 160 allows the created segments to be used as consumable objects. A created segment may be used as an attribute or a measure, as a grouping or member organization technique, and to define included/excluded members. The segment application manager 160 does not introduce new concepts to OLAP, but rather maps the segmentation feature into existing OLAP concepts. The segmentation results, i.e. the actual lists of OLAP members and their captions or labels, generally appear within a report or within an editing environment. Such a report may be saved.

Figure 9:
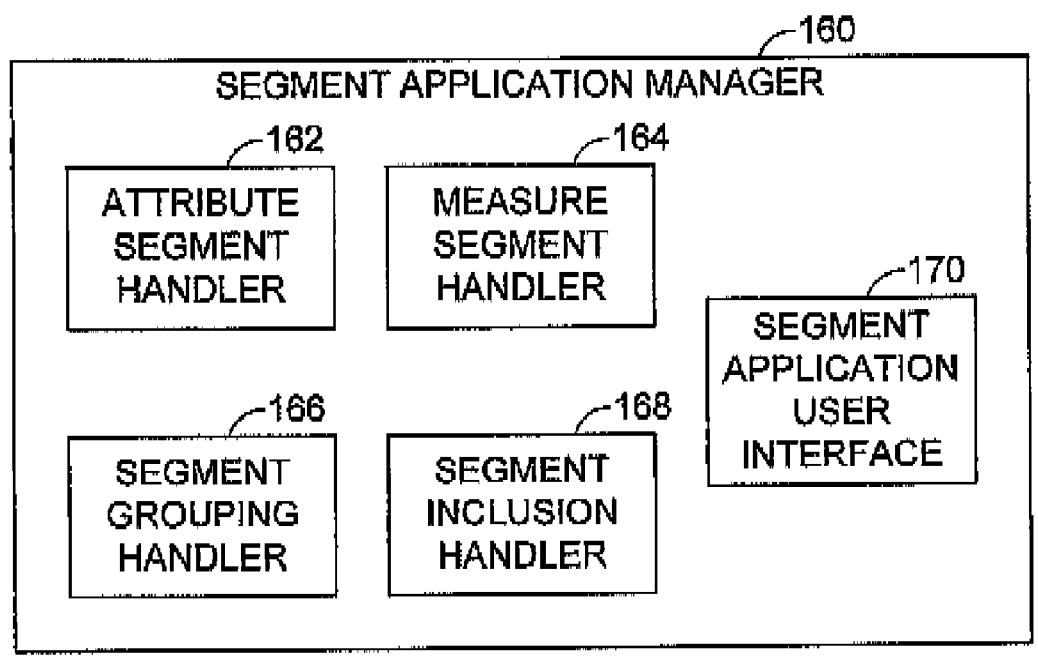
FIG. 9 is a block diagram showing an embodiment of a segment application manager of the segmentation management system.

FIG. 9 shows an embodiment of the segment application manager 160 which includes an attribute segment handler 162, a measure segment handler 164, a segment grouping handler 166, a segment inclusion handler 168 and a segment application user interface 170. In a different embodiment, the segment application manager 160 may have more or fewer of the above or different components.

The attribute segment handler 162 allows created segments to be used as an attribute. The attribute segment handler 162 dynamically generates an attribute value for a member of segments divided from a given base set based on a relevant segmentation rule. The attribute segment handler 162 provides a single value to each member in a segment for the segmentation. For example, as shown in FIG. 4, if each member of the customers dimension is segmented between one of four segments (HVHM, HVLM, LVHM, LVLM) using a "customer value" segmentation rule, then each member may be perceived as having an attribute of "customer value" with one of four possible attribute values. Thus, the segment application manager 160 can make normal operations available for attributes (such as filtering and sorting) available to the user.

The measure segment handler 164 allows created segments to be used as a measure. This allows filtering based on a segment where the segment results are defined based on a tuple in an OLAP cube. Also, using created segments as a measure allows the user to view how a member changes segments across another dimension, such as time. Compared to using created segments as an attribute, using them as a measure allows the value of a segment to take advantage of the richness of multi-dimensional data points.

The measure segment handler 164 computes or determines a segment for each tuple in a cube. The result of the computation is a value that represents the segment. This value may be the segment name or it may be a code for the segment. The measure segment handler 164 can use at least two mechanisms to determine the segment for a tuple. One mechanism is to use the value that corresponds to the tuple. An example of this (using FIG. 4) is to take the two measure values for the members of the tuple (revenue and maintenance) and following the filter rules (1) as described above determine which segment filter matches the values. The other is to look at the constituent members of the tuple and assign a segment based on the members. An example of this (using FIG. 4) would extract the member belonging to the dimension "customer" from the tuple and determine which segment contains that member. The measure segment handler 164 allows the user to filter and sort based on these segments. It also permits the ability to look at the segment of a member (or set of members) across another dimension such as time or to seek out factors in the data that correlate to the segment.

The segment grouping handler 166 handles use of created segments for grouping. The segment grouping handler 166 allows the user to define other groupings through the segment application user interface 170. A grouping is equivalent to a segment. The segment is used for purposes of grouping. Grouping is typically used as an existing UI representation of a set of members. For example, the user may group members about which the user cares (included) and members about which the user does not care (excluded). Such groups are useful for multi-dimensional filtering. Another example of groupings is hierarchical organization of segments, such as tree views and nested cross tab views.

The segment grouping handler 166 treats the segment values as members where the child members are the members belonging to the segment. That is, the segment grouping handler 166 treats the individual segments as calculated members, where the members of the segment are equivalent to children of that calculated member. For example, the segment "bottom 10%" may contain M1, M2, M5. The user can therefore use "bottom 10%" as an equivalent to set(M1, M2, M5). For example, if a set is segmented, the segmentation appears in a tree as an alternate hierarchy, or other UI representation. In the case of a tree, a node appears in the tree with the label "bottom 10%" and expanding this node lists M1, M2 and M5 as member nodes below that node. This use of segments permits the visual representation of a segment in a tree and on a crosstab.

The segment inclusion handler 168 handles an include/exclude feature with created segments. The include/exclude feature provides mechanisms for describing the parts of a set that are of interest and those that are not so that only the parts of the set that are of interest are presented in a report, e.g., a crosstab.

The segment inclusion handler 168 allows the user, through the segment application user interface 170, to define inclusion rules to include or exclude specific segments created by the user through the segment definition manager 120. The segment inclusion handler 168 then allows the inclusion rules to be used to drive complex behaviour for slicers and other features, such as ranking and suppression.

The segment inclusion handler 168 may also handle the include/exclude feature for individual items through a filter, e.g., to divide individual items into three segments: "visible", "remainder" and "excluded", as described in U.S. patent application Ser. No. 11/473,913 filed on Jun. 23, 2006, which is hereby incorporated by reference.

Figure 10:
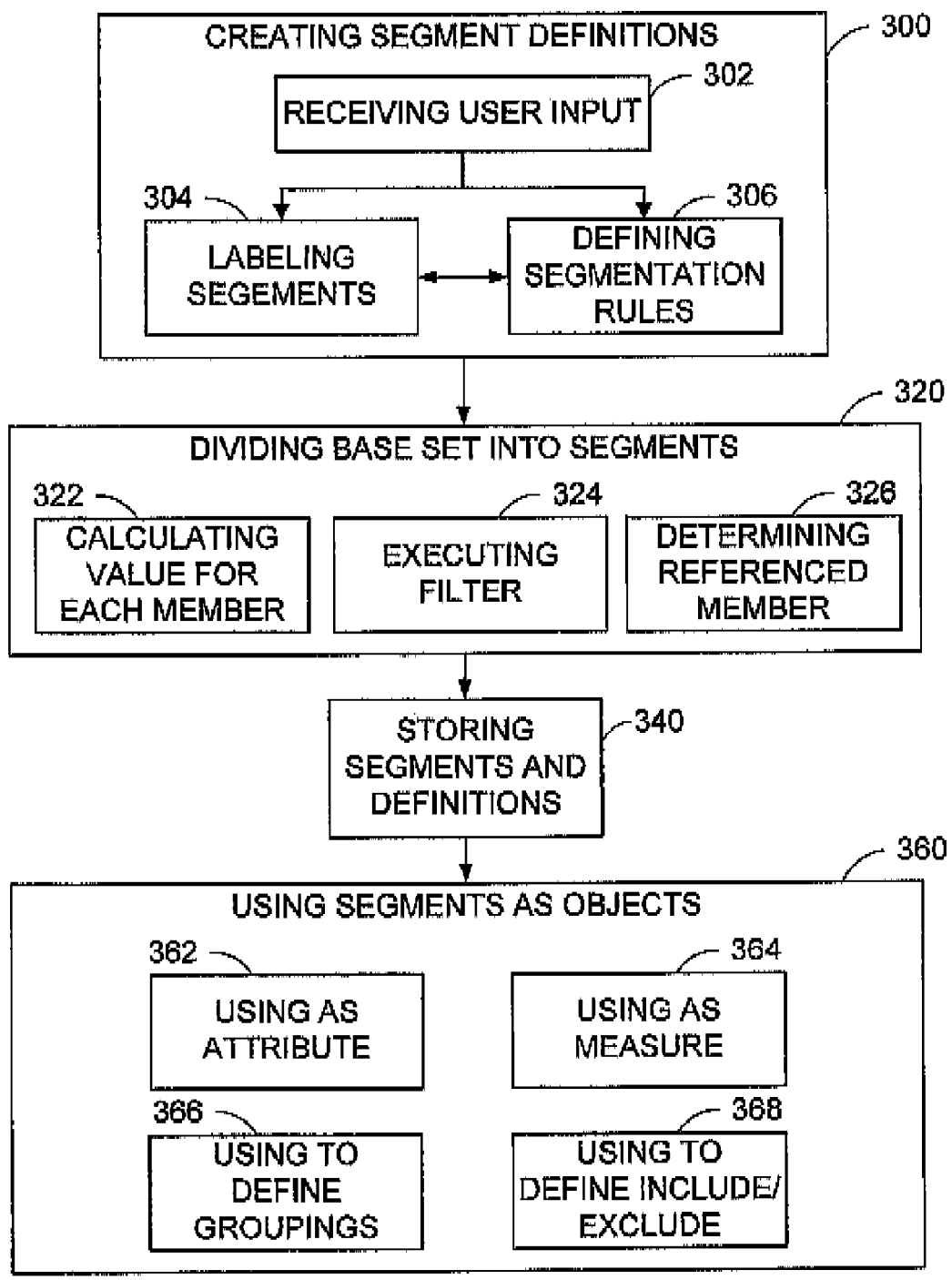
FIG. 10 is a flowchart showing an embodiment of the operation of the segmentation management system.

FIG. 10 shows a flowchart exemplifying the operation of the segmentation management system 100. Using the segment definition manager 120, the user creates definitions of identifiable non-overlapping segments for a given base set of members in a multi-dimensionally modeled data source (300) by receiving user input relating to segmentation rules (302). To define segmentation, the system 100 allows the user to label segments (304), and generate the segmentation rules (306). The order of the steps 304 and 306 may be arbitrary. The rule generating step 306 may include calculating each segment based on segment criteria set by the user, defining the filters, and/or assigning members to the segments using explicit member reference. Also, the rule generating step 306 may include determining data correlation based on a data model representing the data source, and generating possible segmentation rules based on the data correlation for selection by the user.

The segmentation engine 140 divides the base set of members into the segments based on the definitions of the segments (320) by calculating for each member of the base set a value relating to the defined criteria (322), executing a filter defined for a segment to obtain members in the base set that passes the filter (324), and/or determining a member in the base set that is explicitly referenced to be assigned for a given segment (326).

The created segment definitions and the generated segments are stored in a segment store 180 (340).

The segment application manager 160 allows the use of the segments as objects (360). The manager 160 may dynamically generate an attribute value for a member of segments divided from the base set based on a relevant segmentation rule (362), allowing the segments to be used as a measure (364), allowing the user to define groupings based on the segments (366), and/or defining inclusion or exclusion of the segments (368).

The segmentation management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave and may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the segmentation management system are described separately, however, two or more elements may be provided as a single element, or one or more elements may be shared with other components in one or more computer systems.

What is claimed is:

1. A segmentation management system comprising:
 a computer system programmed to manage segmentation of a set of members in a multi-dimensionally modeled data source, wherein the multi-dimensionally modeled data source comprises an Online Analytic Processing database,
 a segment definition manager, implemented by the computer system, to manage definitions of identifiable non-overlapping segments for a given base set of members in a multi-dimensionally modeled data source,
 a segmentation engine, implemented by the computer system, to divide the base set of members into the segments based on the definitions of the segments; and
 a segment application manager, implemented by the computer system, to allow the segments to be used as objects.

2. The segmentation management system as claimed in claim 1, wherein the segment definition manager comprises:
 a rule based segmentation handler for handling segmentation of the base set based on segmentation rules defined by a user; and
 a segmentation user interface for allowing the user to define segmentation rules.

3. The segmentation management system as claimed in claim 2, wherein the rule based segmentation handler comprises:
 a segment labeling unit for handling labeling of segments to identify each segment; and
 a rule generation unit for generating the segmentation rules including a series of filters, each filter defining one of the segments.

4. The segmentation management system as claimed in claim 3, wherein the rule generation unit generates rules for calculating each segment based on segment criteria set by the user, rules for defining the filters, and/or rules for assigning members to the segments using explicit member reference.

5. The segmentation management system as claimed in claim 3, wherein the rule generation unit comprises:
 a wizard based user interface controller for providing a wizard based user interface that assists the user in construction of rules by posing a series of predefined questions; and
 a rule generator for generating rules based on user's selections through the wizard based user interface.

6. The segmentation management system as claimed in claim 3, wherein the rule generation unit comprises:
 a higher level user interface controller for providing a higher level user interface that provides higher level conceptual metaphors that allow the user to generate rules; and
 a rule generator for generating rules based on user's input through the higher level user interface.

7. The segmentation management system as claimed in claim 6, wherein the higher level user interface controller provides an interactive graphical representation of data to allow the user to visually set segments.

8. The segmentation management system as claimed in claim 3, wherein the rule generation unit comprises:
 a segmentation model store for storing available segmentation models, each model having one or more parameters to define segmentations;
 a segmentation model user interface controller for providing a list of available segmentation models, and receiving user's selection of a model and one or more values of parameters associated with the selected model; and
 a rule generator for generating rules based on the selected model and the values of parameters input by the user.

9. The segmentation management system as claimed in claim 1, wherein the segment definition manager comprises:
a discovery based segmentation handler for handling discovery based segmentation to allow the user to use a discovery based engine to create segments without preconceived segmentation of the data.

10. The segmentation management system as claimed in claim 1, wherein the segmentation engine comprises at least one of:
a member calculating unit for calculating for each member of the base set a value relating to the defined criteria;
a member filtering unit for executing a filter defined for a segment to obtain members in the base set that passes the filter; and
a member assigning unit for determining a member in the base set that is explicitly referenced to be assigned for a given segment.

11. The segmentation management system as claimed in claim 1 further comprising:
a segment store for storing segment definitions defined by the segment definition manager and the segments as generated by the segmentation engine.

12. The segmentation management system as claimed in claim 1, wherein the segment application manager comprises at least one of:
an attribute segment handler for dynamically generating an attribute value for a member of segments divided from the base set based on a relevant segmentation rule;
a measure segment handler for allowing the segments to be used as a measure;
a segment grouping handler for allowing the user to define groupings based on the segments; and
a segment inclusion handler for defining inclusion or exclusion of the segments.

13. A method of using a computer system programmed to manage segmentation of a set of members in a multi-dimensionally modeled data source, wherein the multi-dimensionally modeled data source comprises an Online Analytic Processing database, the method comprising:
creating, the computer system, definitions of identifiable non-overlapping segments for a given base set of members in a multi-dimensionally modeled data source,
dividing, by the computer system, the base set of members into the segments based on the definitions of the segments; and
using, by the computer system, the segments as objects.

14. The method as claimed in claim 13, wherein creating, by the computer system, definitions of identifiable non-overlapping segments for the given base set of members in the multi-dimensionally modeled data source comprises:
receiving user input relating to segmentation rules; and
defining the segmentation rules based on the user input.

15. The method as claimed in claim 14, wherein defining the segmentation rules based on the user input comprises:
labeling segments so as to identify each segment; and
generating the segmentation rules including a series of filters, each filter defining one of the segments.

16. The method as claimed in claim 15, wherein generating the segmentation rules including the series of filters comprises generating at least one of rules for calculating each segment based on segment criteria set by the user, rules for defining the filters, and rules for assigning members to the segments using explicit member reference.

17. The method as claimed in claim 15, wherein generating the segmentation rules including the series of filters comprises:
providing a wizard based user interface that assists the user in construction of rules by posing a series of predefined questions; and generating rules based on user's selections through the wizard based user interface.

18. The method as claimed in claim 15, wherein generating the segmentation rules including the series of filters comprises:
providing a higher level user interface that provides higher level conceptual metaphors that allow the user to generate rules; and
generating rules based on user's input through the higher level user interface.

19. The method as claimed in claim 18, wherein providing the higher level user interface comprises:
providing an interactive graphical representation of data to allow the user to visually set segments.

20. The method as claimed in claim 15, wherein generating the segmentation rules including the series of filters comprises:
storing available segmentation models, each model having one or more parameters to define segmentations;
providing a list of available segmentation models;
receiving user's selection of a model and one or more values of parameters associated with the selected model; and
generating rules based on the selected model and the values of parameters input by the user.

21. The method as claimed in claim 13, wherein creating, by the computer system, definitions of identifiable non-overlapping segments for the given base set of members in a multi-dimensionally modeled data source comprises:
determining data correlation using a discovery based engine; and
generating possible segmentation rules based on the data correlation for selection by the user through the segmentation user interface.

22. The method as claimed in claim 13, wherein dividing, by the computer system, the base set of members into the segments based on the definitions of the segments further comprises at least one of:
calculating for each member of the base set a value relating to the defined criteria;
executing a filter defined for a segment to obtain members in the base set that passes the filter; and
determining a member in the base set that is explicitly referenced to be assigned for a given segment.

23. The method as claimed in claim 13 further comprising storing segment definitions defined by the segment definition manager and the segments as generated by the segmentation engine.

24. The method as claimed in claim 13, wherein using, by the computer system, the segments as objects comprises at least one of:
dynamically generating an attribute value for a member of segments divided from the base set based on a relevant segmentation rule;
allowing the segments to be used as a measure;
allowing the user to define groupings based on the segments; and
defining inclusion or exclusion of the segments.

25. A computer readable memory storing instructions or statements for use in the execution in a computer to:
create definitions of identifiable non-overlapping segments for a given base set of members in a multi-dimensionally modeled data source,
divide the base set of members into the segments based on the definitions of the segments; and
use the segments as objects.

* * * * *